US012334637B2

(12) United States Patent
Cheah et al.

(10) Patent No.: US 12,334,637 B2
(45) Date of Patent: Jun. 17, 2025

(54) METASURFACE ANTENNA

(71) Applicants: Tyco Electronics Holdings (Bermuda) No. 7 Limited, Taipei (TW); Tyco Electronics Singapore Pte Ltd, Singapore (SG); National University of Singapore, Singapore (SG)

(72) Inventors: Sin-Hooi Cheah, Taipei (TW); Kim Hai Wong, Singapore (SG); Wei Liu, Singapore (SG); Zhining Chen, Singapore (SG)

(73) Assignees: Tyco Electronics Holdings (Bermuda) No. 7 Limited, Taipei (TV); Tyco Electronics Singapore Pte Ltd, Singapore (SG); National University of Singapore, Singapore (SG)

( * ) Notice: Subject to any disclaimer, the term of this patent is extended or adjusted under 35 U.S.C. 154(b) by 413 days.

(21) Appl. No.: 17/687,855

(22) Filed: Mar. 7, 2022

(65) Prior Publication Data

US 2023/0282984 A1 Sep. 7, 2023

(51) Int. Cl.
*H01Q 15/00* (2006.01)
*H01Q 9/04* (2006.01)
*H01Q 21/06* (2006.01)

(52) U.S. Cl.
CPC ....... *H01Q 15/0086* (2013.01); *H01Q 9/0407* (2013.01); *H01Q 21/065* (2013.01)

(58) Field of Classification Search
CPC ............. H01Q 15/0086; H01Q 9/0407; H01Q 21/065; H01Q 1/523; H01Q 21/0075; H01Q 21/24; H01Q 1/38
See application file for complete search history.

(56) References Cited

U.S. PATENT DOCUMENTS

2012/0287008 A1* 11/2012 Kim .......................... H01Q 1/52
343/841
2020/0227821 A1* 7/2020 Wu .......................... H01Q 1/38

FOREIGN PATENT DOCUMENTS

CN 204011989 U 12/2014
CN 107123898 A 9/2017
(Continued)

OTHER PUBLICATIONS

Extended European Search Report for corresponding EP Application No. 23160207.9-1205 dated Oct. 23, 2023 (15 pages).
(Continued)

*Primary Examiner* — Dieu Hien T Duong
(74) *Attorney, Agent, or Firm* — Jay J. Hoette; The Small Patent Law Group, LLC

(57) ABSTRACT

An antenna assembly includes a metasurface antenna unit including a radiating structure, a feeding structure, and a grounding structure therebetween. The radiating structure includes radiating elements arranged in an m×n grid of m rows of radiating elements and n columns of radiating elements, where n is greater than m. The radiating elements are separated by radiating slots with edges of the radiating elements facing each other across the radiating slots. The grounding structure includes a ground plane having a coupling aperture therethrough. The feeding structure includes a single strip feedline for feeding the radiating elements. The strip feedline passes across the coupling aperture and feeds the radiating structure through the coupling aperture. At least one of the radiating elements is fed through at least one other radiating element across the corresponding radiating slot.

26 Claims, 11 Drawing Sheets

(56) References Cited

FOREIGN PATENT DOCUMENTS

| | | | |
|---|---|---|---|
| CN | 108511897 | A | 9/2018 |
| CN | 109494461 | A | 3/2019 |
| CN | 208570882 | U | 3/2019 |

OTHER PUBLICATIONS

Liu et al. "Miniature Wideband Non-Uniform Metasurface Antenna Using Equivalent Circuit Model" IEEE Transaction on Antennas and Propagation; vol. 68, No. 7; Jul. 2020 (6 pages).

Chen et al. "High-Gain Patch Antenna Based on Cylindrically Projected EBG Planes" EEE Transaction on Antennas and Wireless Propagation Letters; vol. 17, No. 12; Dec. 2018 (5 pages).

Liu et al. "Dispersion-Engineered Wideband Low-Profile Metasurface Antennas" Front Inform Technol Electron Eng.; 2020 21(1):27-38 (12 pages).

Partial European Search Report for corresponding EP Application No. 23160207.9-1205 dated Jul. 7, 2023 (17 pages).

Office Action for Corresponding Application No. 202080050960.2 dated Nov. 20, 2024 (16 Pages).

Office Action for corresponding EP Application No. 23160207.9 dated Mar. 4, 2025 (8 pages).

* cited by examiner

METASURFACE ANTENNA

BACKGROUND OF THE INVENTION

The subject matter herein relates generally to antennas.

Antennas are used in many applications, such as cellular communication applications. For example, Fabry-Perot cavity antennas, lens/reflector antennas, or array antennas are used for high gain antenna applications, such as 5G cellular or mmWave applications. In some applications, microstrip patch antennas are used due to compact design and compatibility with PCB manufacturing. However, each radiating element of the microstrip patch antenna needs to be fed individually, requiring complicated and often lossy feed networks. Additionally, isolation between radiating elements needs to be managed, typically with larger element-to-element spacing. Conventional patch antenna designs have natural limits in terms of gain for a given size or compactness for required gain.

A need remains for a compact, high gain broadband antenna.

BRIEF DESCRIPTION OF THE INVENTION

In one embodiment, an antenna assembly is provided and includes a metasurface antenna unit including a radiating structure, a feeding structure coupled to the radiating structure, and a grounding structure between the radiating structure and the feeding structure. The radiating structure includes radiating elements arranged in an m×n grid of m rows of radiating elements and n columns of radiating elements, where n is greater than m. The radiating elements are separated by radiating slots with edges of the radiating elements facing each other across the radiating slots. The grounding structure includes a ground plane having a coupling aperture therethrough. The feeding structure includes a single strip feedline for feeding the radiating elements. The strip feedline passes across the coupling aperture and feeds the radiating structure through the coupling aperture. At least one of the radiating elements is fed through at least one other radiating element across the corresponding radiating slot.

In another embodiment, an antenna assembly is provided and includes a plurality of metasurface antenna units forming an antenna annular around an antenna pocket. The metasurface antenna units include first and second horizontal polarity metasurface antenna units on opposite sides of the antenna pocket and first and second vertical polarity metasurface antenna units on opposite sides of the antenna pocket. Each metasurface antenna unit includes a radiating structure, a feeding structure coupled to the radiating structure, and a grounding structure between the radiating structure and the feeding structure. The radiating structure includes radiating elements arranged in an m×n grid of m rows of radiating elements and n columns of radiating elements, where n is greater than m. The radiating elements are separated by radiating slots with edges of the radiating elements facing each other across the radiating slots. The grounding structure includes a ground plane having a coupling aperture therethrough, and the feeding structure includes a single strip feedline for feeding the radiating elements. The strip feedline passes across the coupling aperture and feeds the radiating structure through the coupling aperture. At least one of the radiating elements is fed through at least one other radiating element across the corresponding radiating slot. First and second subsets of the radiating elements of the first horizontal polarity metasurface antenna unit are shared with corresponding radiating elements of the first and second vertical polarity metasurface antenna units. First and second subsets of the radiating elements of the second horizontal polarity metasurface antenna unit are shared with corresponding radiating elements of the first and second vertical polarity metasurface antenna units.

In a further embodiment, an antenna assembly is provided and includes an antenna substrate having a radiating substrate at an upper portion of the antenna substrate and a feeding substrate at a lower portion of the antenna substrate. The antenna substrate includes a first quadrant, a second quadrant, a third quadrant, and a fourth quadrant. The antenna assembly includes a first antenna annular in the first quadrant, a second antenna annular in the second quadrant, a third antenna annular in the third quadrant, and a fourth antenna annular in the fourth quadrant. Each of the antenna annulars include a plurality of metasurface antenna units forming a square annular around an antenna pocket. The metasurface antenna units include first and second horizontal polarity metasurface antenna units on opposite sides of the antenna pocket and first and second vertical polarity metasurface antenna units on opposite sides of the antenna pocket. Each metasurface antenna unit includes a radiating structure, a feeding structure coupled to the radiating structure, and a grounding structure between the radiating structure and the feeding structure. The radiating structure includes radiating elements arranged in an m×n grid of m rows of radiating elements and n columns of radiating elements, where n is greater than m. The radiating elements are separated by radiating slots with edges of the radiating elements facing each other across the radiating slots. The grounding structure includes a ground plane having a coupling aperture therethrough, and the feeding structure includes a single strip feedline for feeding the radiating elements. The strip feedline passes across the coupling aperture and feeds the radiating structure through the coupling aperture. At least one of the radiating elements is fed through at least one other radiating element across the corresponding radiating slot. First and second subsets of the radiating elements of the first horizontal polarity metasurface antenna unit are shared with corresponding radiating elements of the first and second vertical polarity metasurface antenna units. First and second subsets of the radiating elements of the second horizontal polarity metasurface antenna unit are shared with corresponding radiating elements of the first and second vertical polarity metasurface antenna units.

DETAILED DESCRIPTION OF THE INVENTION

Figure 1:
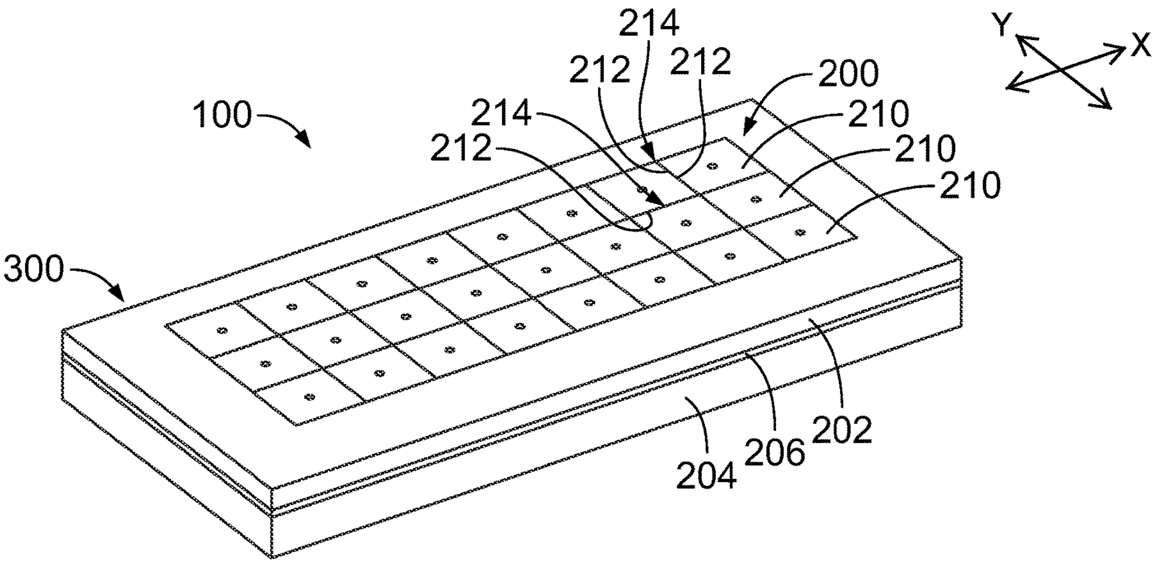
FIG. 1 illustrates an antenna assembly including a metasurface antenna unit in accordance with an exemplary embodiment.
Figure 2:
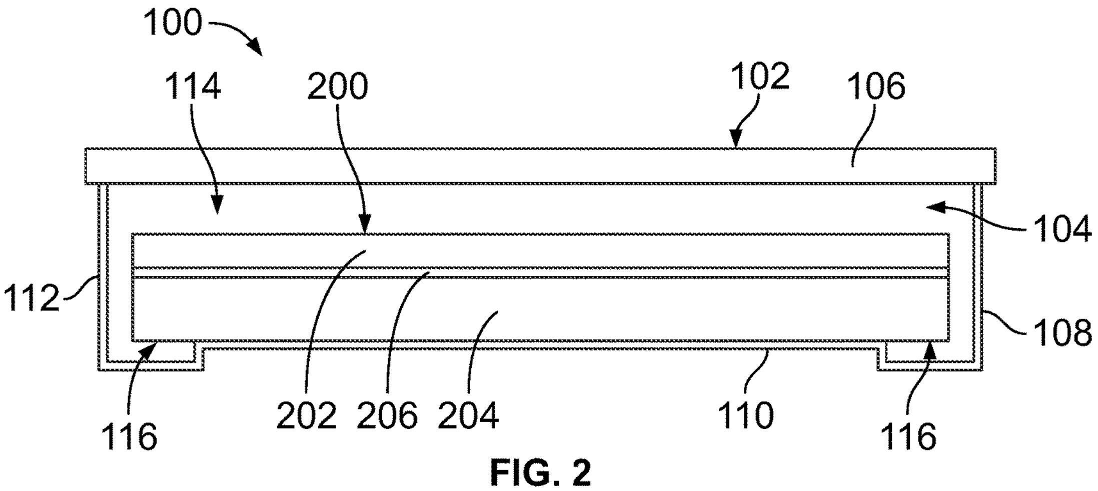
FIG. 2 is a partial sectional view of the antenna assembly showing the metasurface antenna unit within a cover of the antenna assembly in accordance with an exemplary embodiment.

FIG. 1 illustrates an antenna assembly 100 including a metasurface antenna unit 200 in accordance with an exemplary embodiment. FIG. 2 is a partial sectional view of the antenna assembly 100 showing the metasurface antenna unit 200 within a cover 102 of the antenna assembly 100. The metasurface antenna unit 200 forms an antenna element 300. In various embodiments, a plurality of the metasurface antenna units 200 may be combined to form the antenna element 300. For example, the metasurface antenna units 200 may be arranged stacked end-to-end and/or side-to-side to form a larger antenna element 300. In some embodiments, four of the metasurface antenna units 200 may be combined in a square shape to form a square-annular antenna element. Optionally, portions of the metasurface antenna units 200 may be overlapping such that various components may be shared to reduce the overall size and/or cost of the antenna element 300.

In an exemplary embodiment, the metasurface antenna unit 200 is received in a cover cavity 104 of the cover 102. The cover cavity 104 is formed by an upper cover 106 and a lower cover 108. The lower cover 108 includes a base wall 110 and side walls 112. The upper cover 106 is supported by the side walls 112. In an exemplary embodiment, the upper cover 106 is spaced apart from the metasurface antenna unit 200 by a gap 114. The gap 114 may be an air gap. The size of the gap 114 affects operation and performance of the metasurface antenna unit 200. In various embodiments, the lower cover 108 may include one or more choke cavities 116 at the base wall 110 to control operation and performance of the metasurface antenna unit 200.

The metasurface antenna unit 200 includes a radiating structure 202, a feeding structure 204 coupled to the radiating structure 202, and a grounding structure 206 between the radiating structure 202 and the feeding structure 204. The radiating structure 202 includes a plurality of radiating elements 210, also known as mushroom cells, arranged in an m×n grid of m rows of radiating elements 210 and n columns of radiating elements 210. The rows of radiating elements 210 extend in an X direction (H-plane) and the columns of radiating elements extend in a Y direction (E-plane). In an exemplary embodiment, n is greater than m. For example, n may be greater than twice m. Providing a greater number of radiating elements 210 in the E-plane forms an electrically large antenna element. The metasurface antenna unit 200 forms a composite right/left-handed (CRLH) antenna element that may perform well in dual-mode operation. In the illustrated embodiment, the radiating structure 202 includes three rows of the radiating elements 210 and eight columns of the radiating elements 210. The radiating structure 202 may include greater or fewer rows and/or greater or fewer columns in alternative embodiments. The metasurface antenna unit 200 includes the array of radiating elements 200 (for example, mushroom cells). The radiating elements 200 provide a CRLH dispersion relation having an increased number of radiating elements 200 in the E-plane (thus the length of the antenna element in E-plane) to achieve high gain over a desired operating band. The aperture coupling of the radiating structure 202 is used to excite the metasurface antenna unit 200 with dual operating modes, achieving broad bandwidth with a low profile.

Edges 212 of the radiating elements 210 face each other across radiating slots 214. The radiating elements 210 are capacitively coupled to each other across the radiating slots 214. The antenna signals are fed across the radiating structure 202 from radiating element 210 to radiating element 210 by capacitive coupling, such as to a single feed location. For example, at least one of the radiating elements 210 is fed through at least one of the radiating elements 210 across the corresponding radiating slot 214. As such, each radiating element 210 does not include a separate feed element from the feeding structure 204. The feeding network can be greatly simplified by such feeding arrangement of the metasurface antenna unit 200. In an exemplary embodiment, the metasurface antenna unit 200 has a central feed location and the antenna signals are fed outward from column to column and/or row to row. The whole metasurface structure radiates to operate the antenna at the global resonance of the whole metasurface structure.

Figure 3:
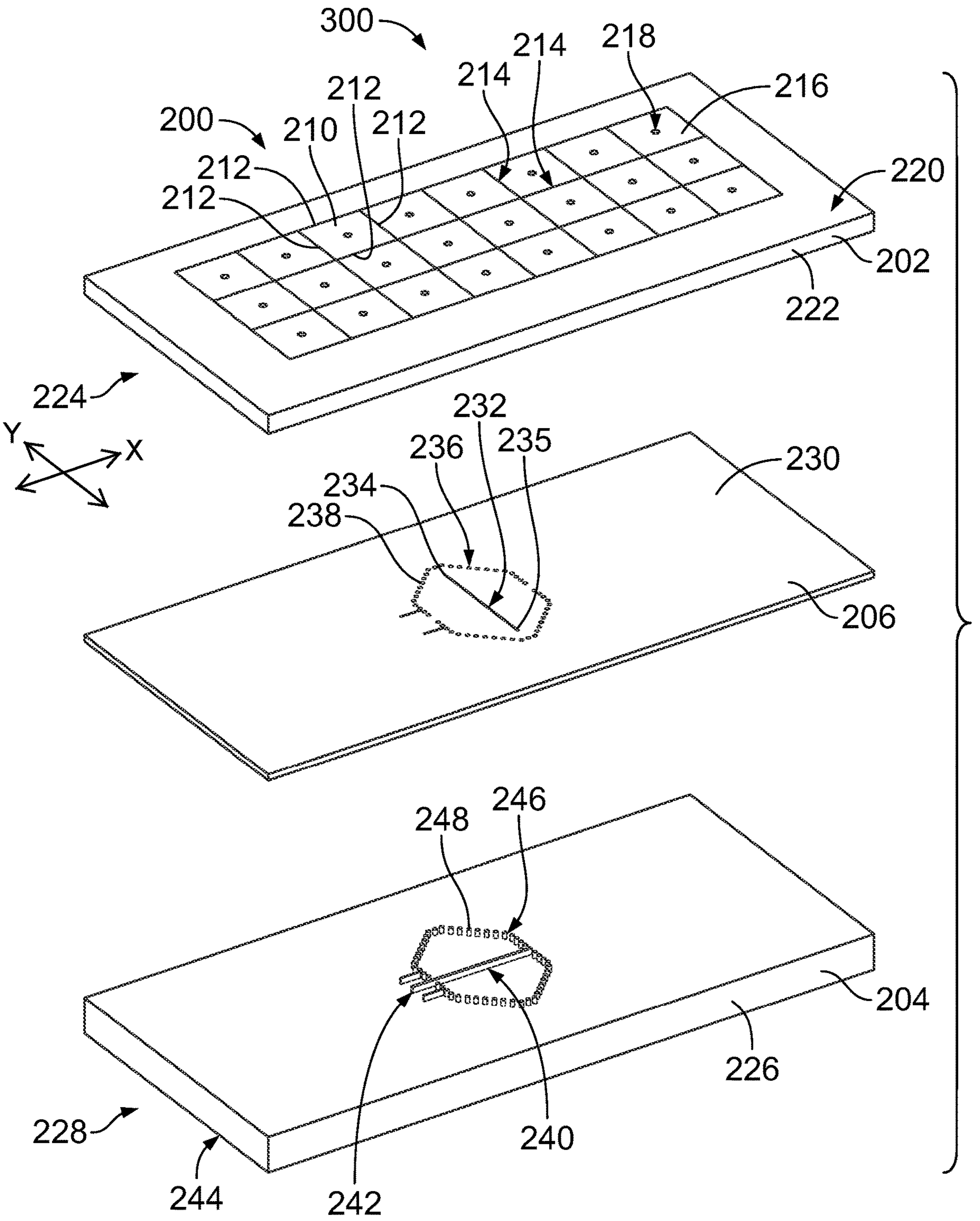
FIG. 3 is an exploded view of the antenna element including the metasurface antenna unit in accordance with an exemplary embodiment.

FIG. 3 is an exploded view of the antenna element 300 including the metasurface antenna unit 200 in accordance with an exemplary embodiment. The metasurface antenna unit 200 includes the radiating structure 202, the feeding structure 204, and the ground structure 206 between the radiating structure 202 and the feeding structure 204.

In an exemplary embodiment, the metasurface antenna unit 200 is a layered structure. The metasurface antenna unit 200 includes an antenna substrate 220 having a plurality of layers. The antenna substrate 220 includes a radiating substrate 222 at an upper portion 224 of the antenna substrate 220 and a feeding substrate 226 at a lower portion 228 of the antenna substrate 220.

Circuits may be printed on one or more layers of the antenna substrate 220. The radiating structure 202 may include one or more circuits. For example, the radiating structure 202 may include traces, pads, vias, planes, or other types of circuits. In an exemplary embodiment, the radiating elements 210 are circuits printed on the upper surface of the radiating substrate 222. The radiating substrate 222 may include one or more ground planes, such as at the upper surface and/or the lower surface and/or intermediate layers. The radiating substrate 222 may include plated vias extending through the radiating substrate 222. The grounding structure 206 may be formed on the radiating substrate 222 and/or the feeding substrate 226. For example, the grounding structure 206 may include one or more ground planes 230, such as a ground plane formed on the lower surface of the radiating substrate 222 or the upper surface of the feeding substrate 226. Alternatively, the grounding structure 206 may be a separate metal plate and/or printed circuit layer sandwiched within the antenna substrate stack. The feeding structure 204 may include one or more circuits. For example, the feeding structure 204 may include traces, pads, vias, planes, or other types of circuits.

In an exemplary embodiment, the radiating elements 210 are arranged in the array of rows and columns. Each radiating element 210 includes a pad 216 and a via 218 extending from the corresponding pad 216 through the radiating structure 202 to a ground plane, such as the ground plane 230. The radiating slots 214 separate the pads 216. In an exemplary embodiment, each pad 216 is rectangular having the edges 212 orthogonal to each other. Optionally, each pad 216 may be square having the edges 212 in the X direction and the Y direction having equal lengths. In an exemplary embodiment, the pads 216 are tightly packaged along the upper surface of the antenna substrate 220 with the edges 212 of adjacent radiating elements 210 parallel to each other and closely positioned across the radiating slots 214. The radiating elements 210 may be strongly capacitively coupled to each other to allow the antenna signals to feed from one radiating element 210 to the next radiating element 210 along the surface of the antenna substrate 220. The tight spacing of the radiating elements 210 form a capacitive feeding network along the radiating structure 202. Widths of the radiating slots 214 may be selected to control the efficiency of the capacitive feeding network. Optionally, the widths of each of the radiating slots 214 may be the same and uniform. Alternatively, the widths of the radiating slots 214 may differ between various rows and/or columns of the radiating elements 210. In an exemplary embodiment, the vias 218 may be centered relative to the pads 216. However, in alternative embodiments, at least some of the vias 218 may be offset from the center of the pads 216. The vias 218 may be offset in the X direction and/or the Y direction relative to the center of the pads 216. The vias 218 may be offset to control radiation patterns of the radiating elements 210, such as in the E-plane (containing the electric field vector) and/or the H-plane (containing the magnetic field vector). In an exemplary embodiment, the enlarged length of the radiating structure 202 in the E-plane (for example, greater number of radiating elements in the X direction than the Y direction) contributes to high gain.

The grounding structure 206 includes the ground plane 230. Optionally, the ground plane 230 may cover the entire antenna substrate 220. The ground plane 230 may be a printed circuit. Alternatively, the ground plane 230 may be a film or plate coupled to the antenna substrate 220. In an exemplary embodiment, the ground plane 230 is planar and parallel to the surface of the radiating elements 210. In an exemplary embodiment, the grounding structure 206 includes a coupling aperture 232 through the ground plane 230. The coupling aperture 232 is an opening through the ground plane 230. The coupling aperture 232 extends from a first end 234 to a second end 235. The coupling aperture 232 is electrically large and affects the antenna characteristics of the antenna element. The coupling aperture 232 forms an opening to allow the antenna signals between the feeding structure 204 and the radiating structure 202. In an exemplary embodiment, the grounding structure 206 includes a via cavity 236 of vias 238 through the metasurface structure. The vias 238 extend between the ground planes 230, such as an upper ground plane and a lower ground plane. The via cavity 236 surrounds the coupling aperture 232. The via cavity 236 of vias 238 control the antenna signaling through the coupling aperture 232. The via cavity 236 of vias 238 provide shielding around the coupling aperture 232.

The feeding structure 204 includes a strip feedline 240 for feeding the antenna signals for the metasurface antenna unit 200. In an exemplary embodiment, the feeding structure 204 includes a single strip feedline 240 for the metasurface antenna unit 200. The strip feedline 240 is formed by a trace circuit along a layer of the feeding substrate 226. The strip feedline 240 is configured to be aligned with the coupling aperture 232 such that the strip feedline 240 bypasses or traverses across the coupling aperture 232. In an exemplary embodiment, the strip feedline 240 extends perpendicular to the coupling aperture 232. For example, the strip feedline 240 extends in the X direction. The strip feedline 240 extends to an input port 242. A feed cable may be electrically connected to the strip feedline 240 at the input port 242. For example, the feed cable may be soldered to the input port 242. In an exemplary embodiment, the feeding structure 204 includes a ground plane 244 at a bottom of the feeding substrate 226. The ground plane 244 is parallel to the ground plane 230. In an exemplary embodiment, the feeding structure 204 includes a via cavity 246 of vias 248 through the feeding substrate 226. The via cavity 246 surrounds the strip feedline 240. For example, the strip feedline 240 is located inside the via cavity 246. The vias 248 are electrically connected between the ground plane 244 and the ground plane 230. The via cavity 246 of vias 248 provide shielding around the strip feedline 240. In an exemplary embodiment, the via cavity 246 suppresses undesired higher order modes and parallel plate modes in the strip feedline 240. The via cavity 246 may block edge diffraction and undesired residents for a lower backward radiation. In the illustrated embodiment, the input port 242 is located exterior of the via cavity 246.

In an exemplary embodiment, the antenna element 300 is a compact, high gain, broadband antenna. The antenna element 300 has a low profile. The antenna element 300 provides a compact arrangement of the radiating elements 210. The compact arrangement allows a single strip feedline 240 to excite the array of radiating elements 210 (for example, 3×8 array) forming the single radiating structure 202, which greatly simplifies the feed network design and insertion losses. The radiating elements 210 in the metasurface antenna unit 200 are extending in a radiating direction (for example, the array may be elongated in the Y-direction, such as in the E-plane) to achieve high gain. The antenna element 300 forms a broadband antenna from a single feed. In an exemplary embodiment, the antenna element 300 has broad bandwidth from two resonant modes (for example, $TM_{10}$ and antiphase $TM_{20}$ modes). In the illustrated embodiment, the metasurface antenna unit 200 has a large electrical aperture of 0.625λ×1.675λ and a low profile of 0.03λ.

In an exemplary embodiment, the metasurface antenna unit 200 has a non-uniform design to control the radiation performance. For example, the metasurface antenna unit 200 may be tuned to improve half-power beamwidth (HPBW), sidelobe level (SLL), front-to-back ratio (FBR), and directivity/gain. The radiation pattern may be controllable with great freedom by changing physical characteristics of the radiating structure 202, the feeding structure 204, and the ground structure 206. For example, a smaller center radiating slot width can be used to achieve the higher FBR and directivity, and narrower HPBW in the E-plane. Radiating slot offsets and/or via offsets can be used for improved antenna directivity, FBR, and SLL in the E-plane. A via wall (plurality of spaced apart vias) may be added around the perimeter of the metasurface antenna unit 200 to increase the gain and improve the operation of the metasurface antenna unit 200.

Figure 4:
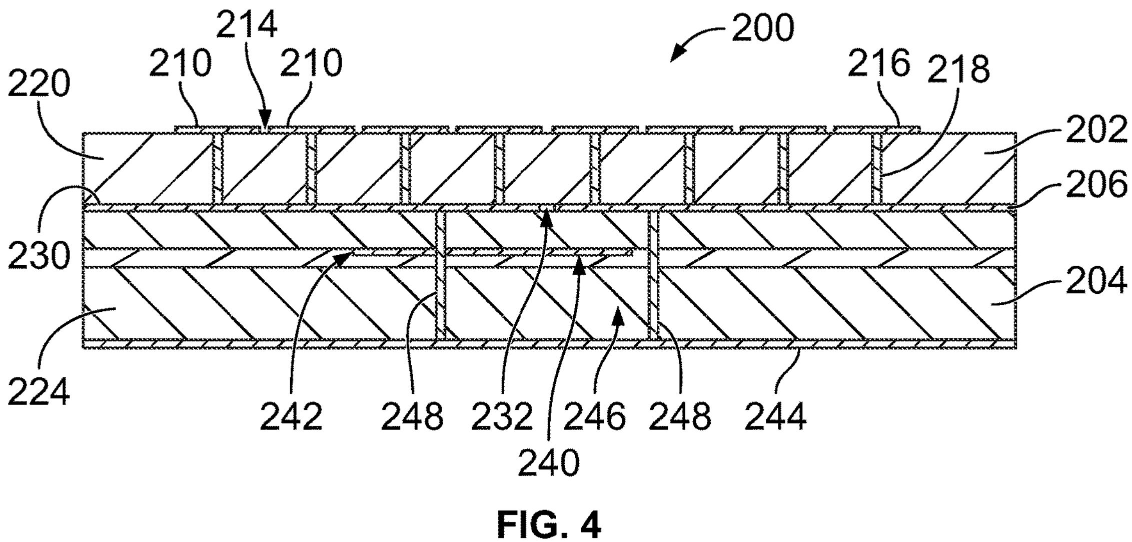
FIG. 4 is a sectional view of the metasurface antenna unit in accordance with an exemplary embodiment.

FIG. 4 is a sectional view of the metasurface antenna unit 200 in accordance with an exemplary embodiment. The metasurface antenna unit 200 includes the radiating structure 202, the feeding structure 204, and the ground structure 206 between the radiating structure 202 and the feeding structure 204. The radiating structure 202, the feeding structure 204, and the ground structure 206 may be a stack-up of layers laminated together. In alternative embodiments, the radiating structure 202 may be separate from the grounding structure 206 and/or the feeding structure 204 may be separate from the grounding structure 206, such as with an air gap(s) therebetween. Optionally, fasteners, such as screws, or other locating elements may be used to hold the radiating structure 202 relative to the grounding structure 206 relative to the feeding structure 204.

In various embodiments, the radiating substrate 222 may be manufactured from a different material compared to the feeding substrate 226. For example, the radiating substrate 222 may be manufactured from a dielectric material having a different dielectric constant compared to the feeding substrate 226. The different dielectric materials may have different thermal expansion characteristics, which could cause warping of the metasurface antenna unit 200 if laminated together. As such, an air gap may be provided between the radiating substrate 222 and the feeding substrate 226 in various embodiments.

The radiating structure 202 includes the radiating elements 210 arranged along an upper surface of the radiating substrate 222. The radiating elements 210 are formed from the pads 216 with the radiating slots 214 therebetween. The vias 218 extend from the corresponding pad 216 through the radiating structure 202 to the ground plane 230. Widths of the radiating slots 214 may be selected to control the efficiency of the capacitive feeding network.

The grounding structure 206 includes the ground plane 230. The coupling aperture 232 is an opening through the ground plane 230 that allows the antenna signals between the feeding structure 204 and the radiating structure 202. Optionally, the coupling aperture 232 may be aligned with one of the radiating slots 214, such as at a center of the array of radiating elements 210. The antenna signals are fed from the feeding structure 204 to the center of the radiating structure 202 through the coupling aperture 232. Optionally, a width of the coupling aperture 232 may be approximately equal to the widths of the radiating slots 214. However, the width of the coupling aperture 232 may be wider than the widths of the radiating slots 214. The dimensions of the coupling aperture 232 are used for impedance matching.

The feeding structure 204 includes the strip feedline 240 for feeding the antenna signals for the metasurface antenna unit 200. In the illustrated embodiment, the strip feedline 240 is located at an internal layer of the feeding substrate 226. The strip feedline 240 traverses across the coupling aperture 232 (for example, located directly below the coupling aperture 232 and extending from one side of the coupling aperture 232 to another side of the coupling aperture 232). The feeding structure 204 includes the vias 248 electrically connected between the ground plane 244 and the ground plane 230. The via cavity 246 of the vias 248 surround the strip feedline 240 (for example, the strip feedline 240 extends with the via cavity 246). In the illustrated embodiment, the input port 242 is located exterior of the via cavity 246.

Figure 5:
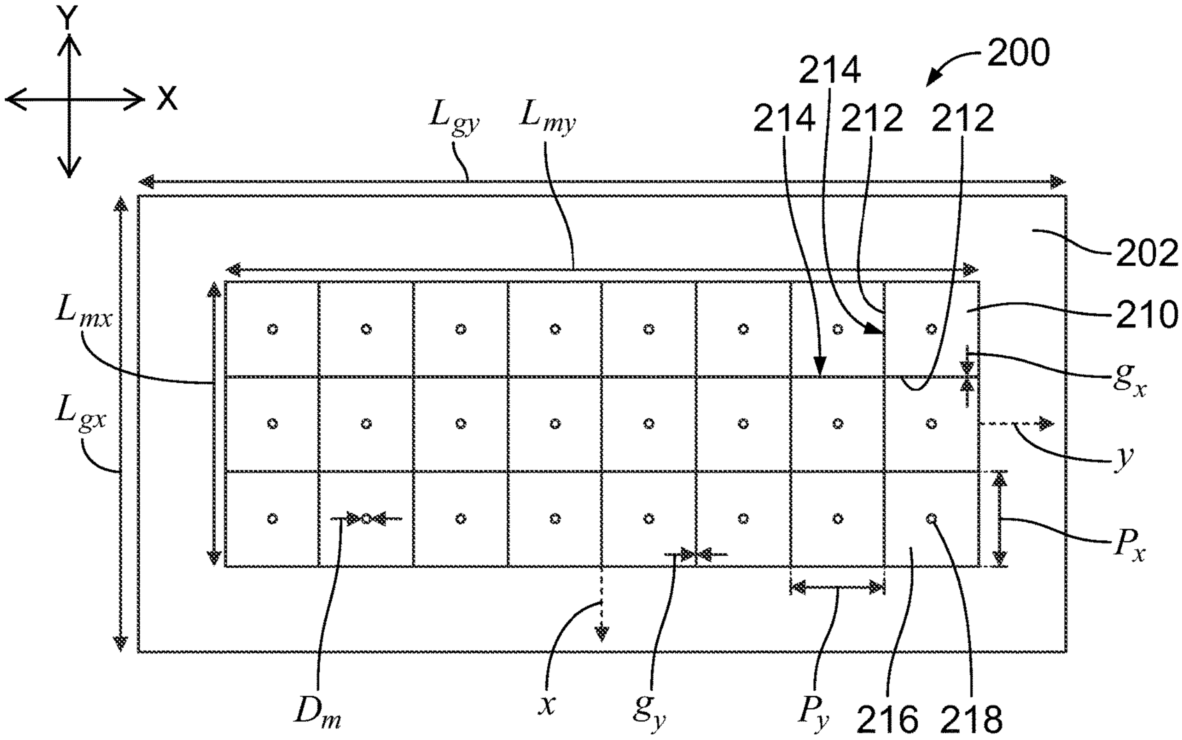
FIG. 5 is a top view of the radiating structure of the metasurface antenna unit in accordance with an exemplary embodiment.

FIG. 5 is a top view of the radiating structure 202 of the metasurface antenna unit 200 in accordance with an exemplary embodiment. FIG. 5 illustrates dimensional control variables that may be selectively controlled to tune the metasurface antenna unit 200. For example, the substrate length in the X direction and/or the substrate length in the Y direction may be controlled (for example, varied or selected as a design parameter). The length of the array of radiating elements 210 in the X direction and the length of the array of the radiating elements 210 in the Y direction may be controlled. The number of radiating elements 210 in the X direction and the number of radiating elements 210 in the Y direction may be controlled. The length of each radiating element 210 in the X direction and the length of each radiating element 210 in the Y direction may be controlled. For example, the length of the radiating element 210 may decrease to lower the operating frequency of the antenna element, such as to a lower band. Changing the lengths of the radiating elements 210 may shift the radiation performance in the E-plane. The width of the radiating slot 214 in the X direction and the width of the radiating slot 214 in the Y direction may be controlled. For example, increasing the radiating slot width may result in a reduction in sidelobe level (SLL) in the E-plane. Increasing the radiating slot width may result in a gain drop over the operating band. The diameter of the vias 218 may be controlled. For example, increasing the via diameter mage causes mode frequencies increase. Increasing the via diameter may narrow the half power beam width (HPBW) in the E-plane. Increasing the via diameter may cause reduction in the FBR in the lower operating band. The positions of the vias 218 relative to the edges 212 of the pads 216 may be also controlled.

Figure 6:
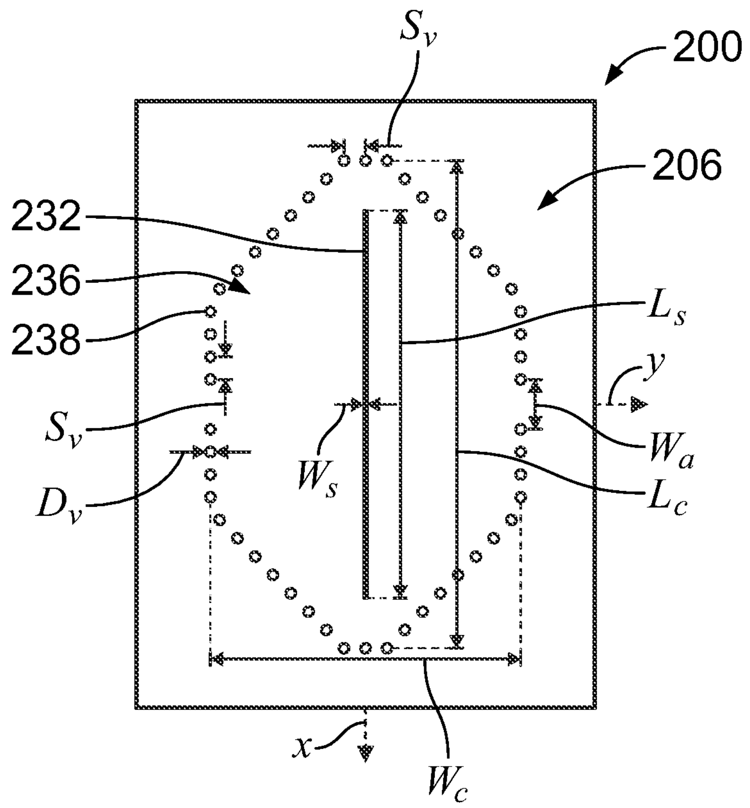
FIG. 6 is a top view of the grounding structure of the metasurface antenna unit in accordance with an exemplary embodiment.

FIG. 6 is a top view of the grounding structure 206 of the metasurface antenna unit 200 in accordance with an exemplary embodiment. FIG. 6 illustrates dimensional control variables that may be selectively controlled to tune the metasurface antenna unit 200. For example, the length and/or the width of the coupling aperture 232 may be controlled (for example, varied or selected as a design parameter). The orientation of the coupling aperture 232 may be controlled (for example, along the x-axis, along the y-axis, or transverse to the X and Y axes). The diameters of the vias 238 may be controlled. The pitch or center line spacing between the vias 238 may be controlled. The number of vias 238 may be controlled. The shape of the via cavity 236 may be controlled. For example, a width and/or a length of the via cavity 236 may be controlled. The spacing between the coupling aperture 232 and the vias 238 of the via cavity 236 may be controlled. Widths and/or locations of gaps in the via cavity 236 may be controlled, such as aligned with the strip feedline 240 (shown in FIG. 7).

Figure 7:
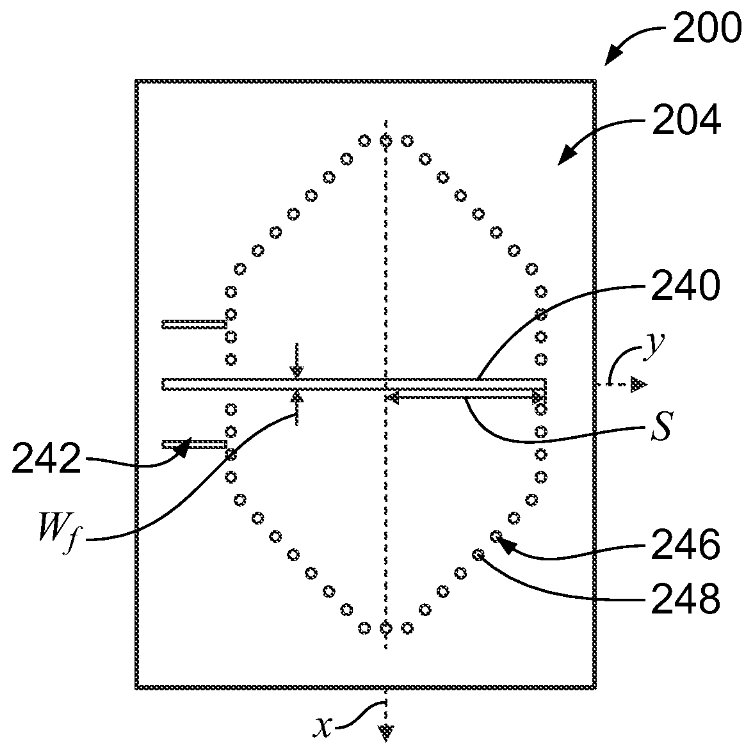
FIG. 7 is a top view of the feeding structure of the metasurface antenna unit in accordance with an exemplary embodiment.

FIG. 7 is a top view of the feeding structure 204 of the metasurface antenna unit 200 in accordance with an exemplary embodiment. FIG. 7 illustrates dimensional control variables that may be selectively controlled to tune the metasurface antenna unit 200. For example, the length and/or the width of the strip feedline 240 may be controlled (for example, varied or selected as a design parameter). The orientation of the strip feedline 240 may be controlled (for example, along the x-axis, along the y-axis, or transverse to the X and Y axes). In an exemplary embodiment, the strip feedline 240 has an orientation that is perpendicular to the orientation of the coupling aperture 232 (shown in FIG. 6). The diameters of the vias 248 may be controlled. The pitch or center line spacing between the vias 248 may be controlled. The number of vias 248 may be controlled. The shape of the via cavity 246 may be controlled. For example, a width and/or a length of the via cavity 246 may be controlled. In various embodiments, the shape of the via cavity 246 corresponds to the shape of the via cavity 236 (shown in FIG. 6). In various embodiments, the vias 248 are aligned with the corresponding vias 238 (shown in FIG. 6). The spacing between the strip feedline 240 and the vias 248 of the via cavity 246 may be controlled. Widths and/or locations of gaps in the via cavity 246 may be controlled, such as aligned with the strip feedline 240 to allow the strip feedline 240 to exit the via cavity 246 along the input port 242.

Figure 8:
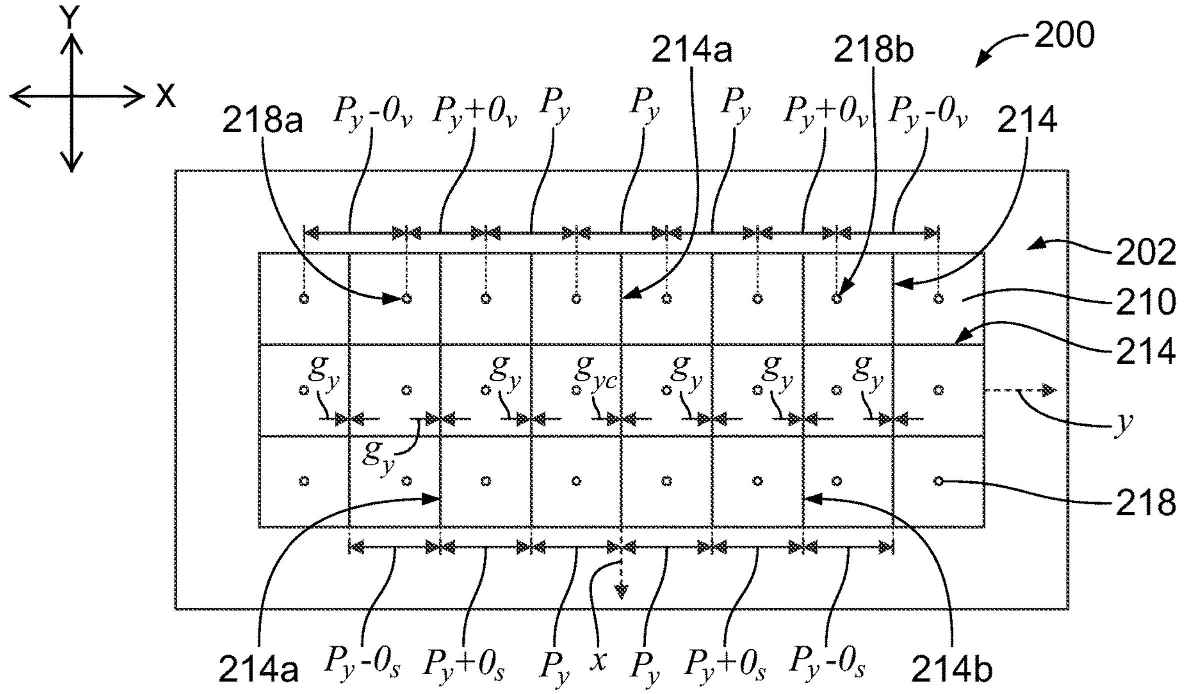
FIG. 8 is a top view of the radiating structure of the metasurface antenna unit in accordance with an exemplary embodiment.

FIG. 8 is a top view of the radiating structure 202 of the metasurface antenna unit 200 in accordance with an exemplary embodiment. FIG. 8 illustrates the radiating structure 202 having non-uniformities to realize controllable antenna characteristics to tune the metasurface antenna unit 200. For example, the nonuniformities make controlled radiation patterns of the metasurface antenna unit 200 in the E-plane.

In an exemplary embodiment, the center radiating slot 214 forms a feeding radiating slot 214*a*. The feeding radiating slot 214*a* is configured to be aligned with the coupling aperture 232 (shown in FIG. 6). The feeding radiating slot 214*a* is capacitively coupled to the strip feedline 240 (shown in FIG. 7) through the coupling aperture 232 to receive the antenna signals. The radiating elements 210 on either side of the feeding radiating slot 214*a* are excited by the antenna signals received through the coupling aperture 232. The antenna signals are fed successively outward to the radiating elements 210 in the adjacent columns by capacitive coupling between the radiating elements 210 across the radiating slots 214. As such, all of the radiating elements 210 may be fed using a single strip feedline 240. The feeding network may be kept simple using the single strip feedline 240 to feed multiple radiating elements 210. The metasurface antenna unit 200 achieves high gain and broadband signaling using a simplified feeding network. In various embodiments, the feeding radiating slot 214*a* may have a different width from other radiating slots 214. For example, the feeding radiating slot 214*a* may be slightly wider than the other radiating slots 214 or slightly narrower than the other radiating slots 214. In various embodiments, decreasing the width of the radiating slot 214*a* may decrease the mode frequency and/or increase antenna directivity and/or improve FBR and/or reduce HPBW in the E-plane.

In an exemplary embodiment, the radiating slots 214 may be offset (for example, shifted left or right) by a slot offset ($o_s$) to vary widths of the radiating elements 210. In the illustrated embodiment, the metasurface antenna unit 200 is shown to include offset radiating slots 214*b*, 214*c*. The radiating elements 210 on one side of the offset radiating slot is thus wider and the radiating elements 210 on the opposite sides of the offset radiating slot are narrower. Providing the slot offset may change the mode frequency of the antenna element, which may improve the SLL of the E-plane over a broad bandwidth. Providing the slot offset may increase antenna directivity and/or provide a wider HPBW in the E-plane and/or provide a lower FBR.

In an exemplary embodiment, the vias 218 may be offset (for example, shifted left or right) by a via offset ($o_v$) to vary centerline spacings between various vias 218. In the illustrated embodiment, the metasurface antenna unit 200 is shown to include offset vias 218*a*, 218*b*, which changes centerline spacings between the vias 218 to one side of the offset vias 218*a*, 218*b* compared to the vias 218 to the other side of the offset vias 218*a*, 218*b*. Providing the via offset may change the mode frequency of the antenna element, which may improve the SLL of the E-plane over a broad bandwidth. Providing the via offset may increase antenna directivity and/or improve FBR.

In an exemplary embodiment, for the electrically large, nonuniform metasurface antenna unit, the smaller center radiating slot can be used to achieve the higher FBR and gain. The positive slot offset and negative via offset can be used to improve directivity and SLL in the E-plane.

Figure 9:
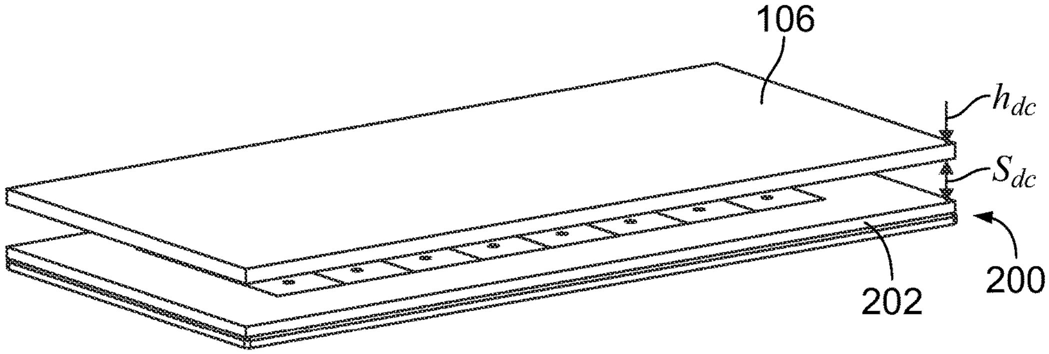
FIG. 9 is a perspective view of the metasurface antenna unit in accordance with an exemplary embodiment showing the upper cover relative to the radiating structure.

FIG. 9 is a perspective view of the metasurface antenna unit 200 in accordance with an exemplary embodiment showing the upper cover 106 relative to the radiating structure 202. In an exemplary embodiment, a spacing between the upper cover 106 and the upper surface of the radiating structure 202 may be dimensionally controlled to tune the operation of the metasurface antenna unit 200. For example, the spacing may be decreased to achieve a higher gain or a higher front-to-back ratio (FBR). The type of dielectric material and/or the thickness of the cover 106 may be dimensionally controlled to tune the operation of the metasurface antenna unit 200.

Figure 10:
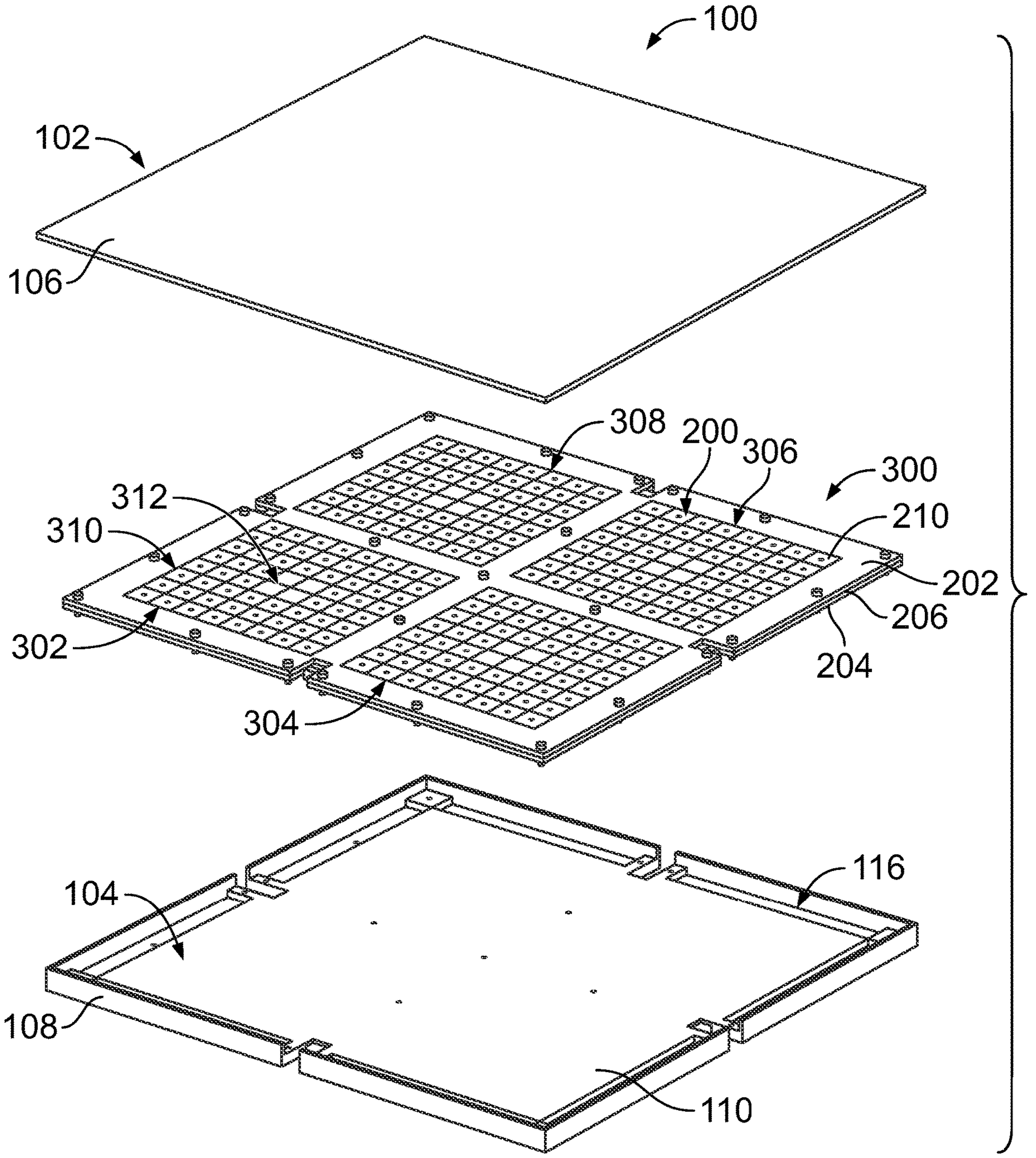
FIG. 10 illustrates the antenna assembly in accordance with an exemplary embodiment.

FIG. 10 illustrates the antenna assembly 100 in accordance with an exemplary embodiment. The antenna assembly 100 includes the antenna element 300 and the cover 102 used to hold the antenna element 300. In the illustrated embodiment, the antenna element 300 includes a plurality of the metasurface antenna units 200 combined into square-annular antenna elements 302, 304, 306, 308.

The cover 102 includes the upper cover 106 and the lower cover 108 forming the cover cavity 104. The lower cover 108 includes choke cavities 116 at the base wall 110, such as along all four sides of the base wall 110, to control operation and performance of the metasurface antenna unit 200. The choke cavities 116 may be quarter wavelength choke cavities 116. The choke cavities 116 increase FBR.

In an exemplary embodiment, the structures of the metasurface antenna units 200 may be combined into combined structures. For example, the radiating structures 202, feeding structures 204, and grounding structures 206 of the multiple metasurface antenna units 200 are combined such that the antenna element 300 includes a single radiating structure 202 (for example, substrate and circuits), a single feeding structure 204 (for example, substrate and circuits), and a single grounding structure 206 (for example, circuit and/or plate and/or substrate).

The radiating structure 202 includes a plurality of radiating elements 210 arranged in grids or arrays. The radiating elements 210 are in rows and columns. In the illustrated embodiment, a plurality of the metasurface antenna units 200 (shown in FIG. 1) are combined into the square-annular antenna elements 302, 304, 306, 308. Each square-annular antenna element 302, 304, 306, 308 includes a square annular 310 of radiating elements 210 around an antenna pocket 312. The antenna pocket 312 does not include any radiating elements 210. The antenna pocket 312 is an area of the array of radiating elements 210 that is devoid of any radiating elements 210. In the illustrated embodiment, each square annular 310 is an 8×8 grid with the central 2×2 area forming the antenna pocket 312. The square annular structure may be used for dual-polarized antenna elements, such as horizontal polarization and vertical polarization. For example, each square annular structure may have two input ports for horizontal polarization and two input ports for vertical polarization. The square annular structure may include two of the metasurface antenna units 200 (for example, east-west) for horizontal polarization and two of the metasurface antenna units 200 for vertical polarization (for example, north-south).

In an exemplary embodiment, the antenna element 300 is dual polarized achieved by the orthogonal arrangement of the metasurface antenna units 200 (four metasurface antenna units 200 arranged in the square annular 310). Each square annular 310 has two sets of coupling apertures for dual polarization. The square annulars 310 are repeated in each of the four quadrants to further increase the electrical size and achieve very high gain, such as 17 dB gain. The antenna element 300 has four feed ports and a simplified feeding network for feeding the four square annulars 310. The feed ports are arranged along different sides of the antenna element 300 and have high port isolation. The feeding network is simplified due to the electrically large metasurface antenna element.

Figure 11:
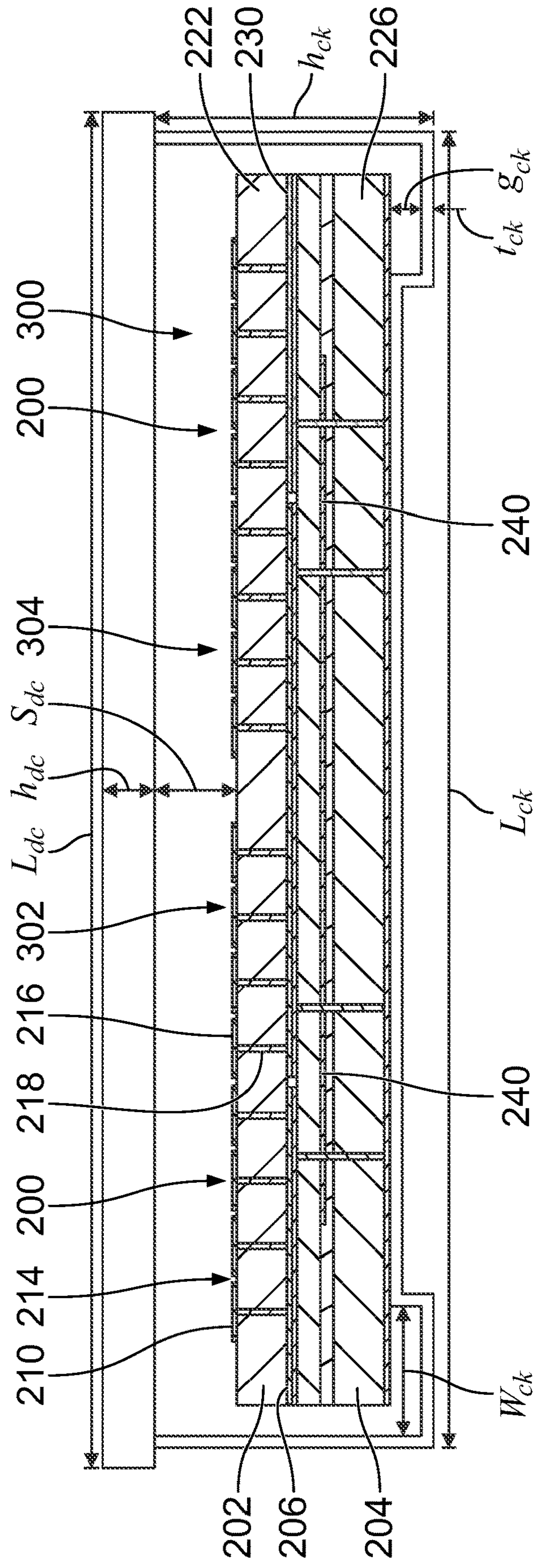
FIG. 11 is a sectional view of the metasurface antenna unit in accordance with an exemplary embodiment.

FIG. 11 is a sectional view of the metasurface antenna unit 200 in accordance with an exemplary embodiment. The metasurface antenna unit 200 includes the radiating structure 202, the feeding structure 204, and the ground structure 206 between the radiating structure 202 and the feeding structure 204. The radiating structure 202, the feeding structure 204, and the ground structure 206 may be a stack-up of layers laminated together. FIG. 11 shows two of the square annular antenna elements 302, 304.

In various embodiments, the radiating substrate 222 may be manufactured from a different material compared to the feeding substrate 226. For example, the radiating substrate 222 may be manufactured from a dielectric material having a different dielectric constant compared to the feeding substrate 226. The radiating substrate 222 may be manufactured from a material having a lower dielectric constant. The dielectric materials may be different for enhanced electrical performance and/or lower cost of the antenna element 300. The different dielectric materials may have different thermal expansion characteristics, which could cause warping of the metasurface antenna unit 200 if laminated together. As such, an air gap may be provided between the radiating substrate 222 and the feeding substrate 226 in various embodiments to manage lamination warpage due to the difference in thermal expansion. Fasteners, such as screws, may be used to hold the assembly together.

The feeding structure 204 includes at least one strip feedline 240. In the illustrated embodiment, the same strip feedline 240 is used for both of the square annular antenna elements 302, 304. The grounding structure 206 includes the ground plane 230 having one of the coupling apertures 232 for each square annular antenna element 302, 304. The radiating structure 202 includes corresponding radiating elements 210 for each square annular antenna element 302, 304. The radiating elements 210 are formed from the pads 216 with the radiating slots 214 therebetween. The vias 218 extend from the corresponding pad 216 through the radiating structure 202 to the ground plane 230. The antenna signals are transmitted through the coupling aperture 232 between the strip feedline 240 and the radiating elements 210.

Figure 12:
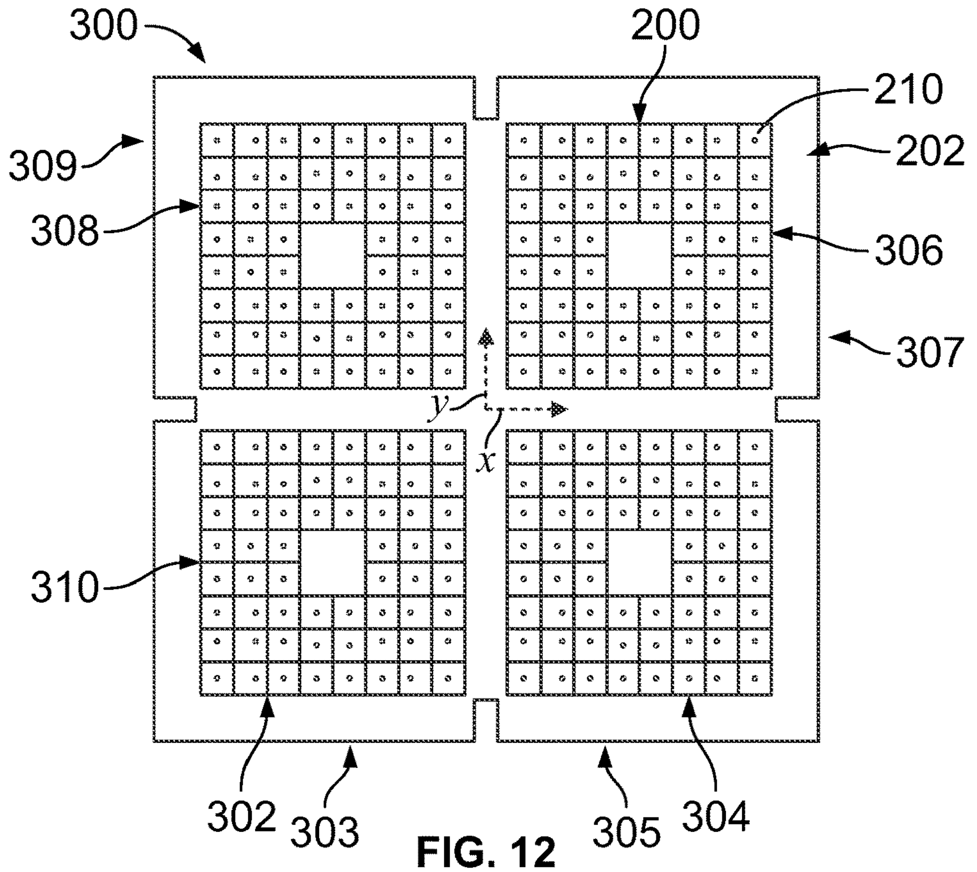
FIG. 12 is a top view of the radiating structure of the antenna element in accordance with an exemplary embodiment.

FIG. 12 is a top view of the radiating structure 202 of the antenna element 300 in accordance with an exemplary embodiment. In the illustrated embodiment, the antenna element 300 includes a plurality of the metasurface antenna units 200 combined into the square-annular antenna elements 302, 304, 306, 308. The first square annular antenna element 302 is located in a first quadrant 303 (for example, south-west). The second square annular antenna element 304 is located in a second quadrant 305 (for example, south-east). The third square annular antenna element 306 is located in a third quadrant 307 (for example, north-east). The fourth square annular antenna element 308 is located in a fourth quadrant 309 (for example, north-west). Optionally, the square annular antenna elements 302, 304, 306, 308 may be identical to each other; however, the square annular antenna elements 302, 304, 306, 308 may be different from each other in alternative embodiments, such as to have different radiating patterns or frequencies. Each square annular antenna element 302, 304, 306, 308 includes a corresponding square annular 310 of radiating elements 210.

Figure 13:
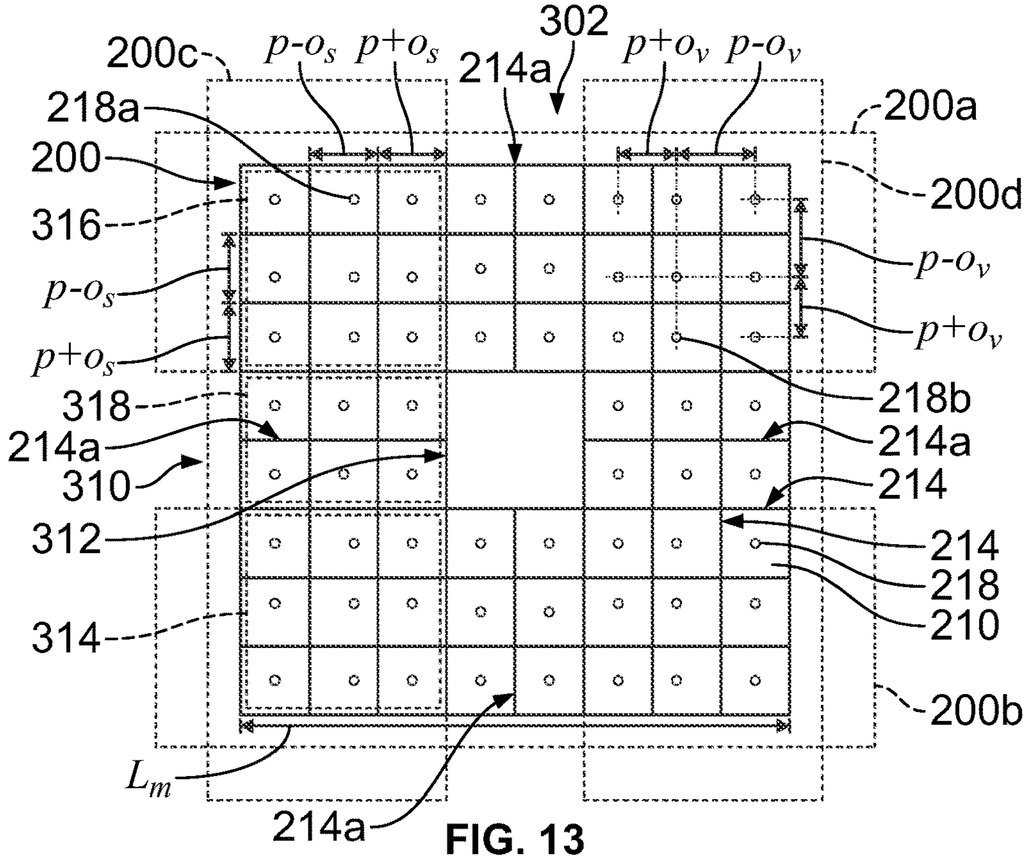
FIG. 13 illustrates the square annular representing the square annular antenna element in accordance with an exemplary embodiment.

FIG. 13 illustrates the square annular 310 representing the square annular antenna element 302. The square annular 310 includes a plurality of radiating elements 210 arranged in grids or arrays. The radiating elements 210 are in rows and columns. In the illustrated embodiment, a plurality of the metasurface antenna units 200 are combined into the square annular 310. For example, in the illustrated embodiment, four of the metasurface antenna units 200*a*, 200*b*, 200*c*, 200*d* are arranged in a ring forming the square annular 310 around the antenna pocket 312. In the illustrated embodiment, each square annular 310 is an 8×8 grid with the central 2×2 grid area forming the antenna pocket 312.

In an exemplary embodiment, the square annular 310 is used for dual linear polarization, such as horizontal polarization and vertical polarization. In other various embodiments, the square annular 310 is used for dual circular polarization, such as left-hand polarization and right-hand polarization. The first metasurface antenna unit 200*a* is a first horizontal polarity metasurface antenna unit 200*a*. The second metasurface antenna unit 200*b* is a second horizontal polarity metasurface antenna unit 200*b*. The third metasurface antenna unit 200*c* is a first vertical polarity metasurface antenna unit 200*c*. The fourth metasurface antenna unit 200*d* is a second vertical polarity metasurface antenna unit 200*d*.

In an exemplary embodiment, each metasurface antenna unit 200 includes overlapping regions 314, 316 and a non-overlapping region 318 between the overlapping regions 314, 316. For example, the first metasurface antenna unit 200*a* overlaps with the third metasurface antenna unit 200*c* and the fourth metasurface antenna unit 200*d* at the overlapping regions 314, 316 and the second metasurface antenna unit 200*b* overlaps with the third metasurface antenna unit 200*c* and the fourth metasurface antenna unit 200*d* at the overlapping regions 314, 316. The radiating elements 210 in the overlapping regions 314, 316 are shared. For example, the radiating elements 210 in the overlapping regions 314, 316 are radiated by both corresponding metasurface antenna units and thus have both horizontal polarization and vertical polarization. In the illustrated embodiment, the overlapping regions 314, 316 are 3×3 grid areas. The non-overlapping regions 318 are 3×2 grid areas between the overlapping regions 314, 316. In an exemplary embodiment, the non-overlapping regions 318 are centered along the metasurface antenna unit 200. In an exemplary embodiment, the feeding radiating slots 214*a* are centered within the non-overlapping regions 318, such as centered within the 3×2 grid area. The antenna signals are fed into the metasurface antenna units 200 at the feeding radiating slots 214*a*, such as at the centers of the 3×2 grid areas of the non-overlapping regions 318. The first and second horizontal polarity metasurface antenna units 200*a*, 200*b* are fed along the X-axis. The first and second vertical polarity metasurface antenna units 200*c*, 200*d* are fed along the Y-axis.

In an exemplary embodiment, the radiating slots 214 may be offset (for example, shifted left or right or up or down) to vary widths of the radiating elements 210. In various embodiments, the metasurface antenna unit 200 may include offset radiating slots. The radiating elements 210 on one side of the offset radiating slot is thus wider and the radiating elements 210 on the opposite sides of the offset radiating slot are narrower. Providing the slot offset may change the mode frequency of the antenna element, which may improve the SLL of the E-plane over a broad bandwidth. Providing the slot offset may increase antenna directivity and/or provide a wider HPBW in the E-plane and/or provide a lower FBR.

In an exemplary embodiment, the vias 218 may be offset (for example, shifted left or right or up or down) to vary centerline spacings between various vias 218. In the illustrated embodiment, the metasurface antenna unit 200 is shown to include offset vias 218*a*, 218*b*, which changes centerline spacings between the vias 218 to one side of the offset vias 218*a*, 218*b* compared to the vias 218 to the other side of the offset vias 218*a*, 218*b*. Providing the via offset may change the mode frequency of the antenna element, which may improve the SLL of the E-plane over a broad bandwidth. Providing the via offset may increase antenna directivity and/or improve FBR.

In an exemplary embodiment, for the electrically large, nonuniform metasurface antenna unit, the smaller center radiating slot can be used to achieve the higher FBR and gain. The positive slot offset and negative via offset can be used to improve directivity and SLL in the E-plane.

Figure 14:
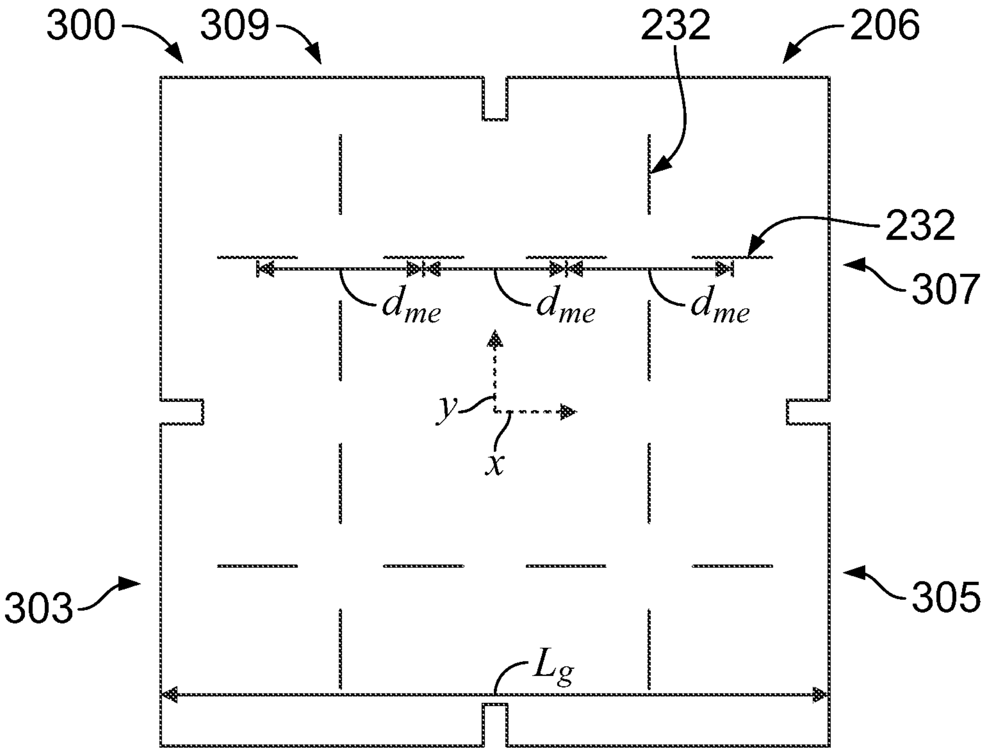
FIG. 14 is a top view of the grounding with feeding coupling slot structure of the antenna element in accordance with an exemplary embodiment.

FIG. 14 is a top view of the grounding structure 206 of the antenna element 300 in accordance with an exemplary embodiment. FIG. 14 illustrates the coupling apertures 232. In an exemplary embodiment, the coupling apertures 232 are provided in each of the four quadrants 303, 305, 307, 309, such as for each of the square annulars 310 (shown in FIG. 12). In an exemplary embodiment, the coupling apertures 232 are arranged generally in a+ shape in each quadrant for feeding the square annulars 310. For example, each coupling aperture 232 is configured to be positioned directly below the corresponding feeding radiating slot 214*a* (shown in FIG. 13). The coupling apertures 232 may have lengths approximately equal to the lengths of the feeding radiating slots 214*a*. The spacings between the coupling apertures 232 may be based on the positioning of the square annulars 310 and the corresponding feeding radiating slots 214*a*.

Figure 15:
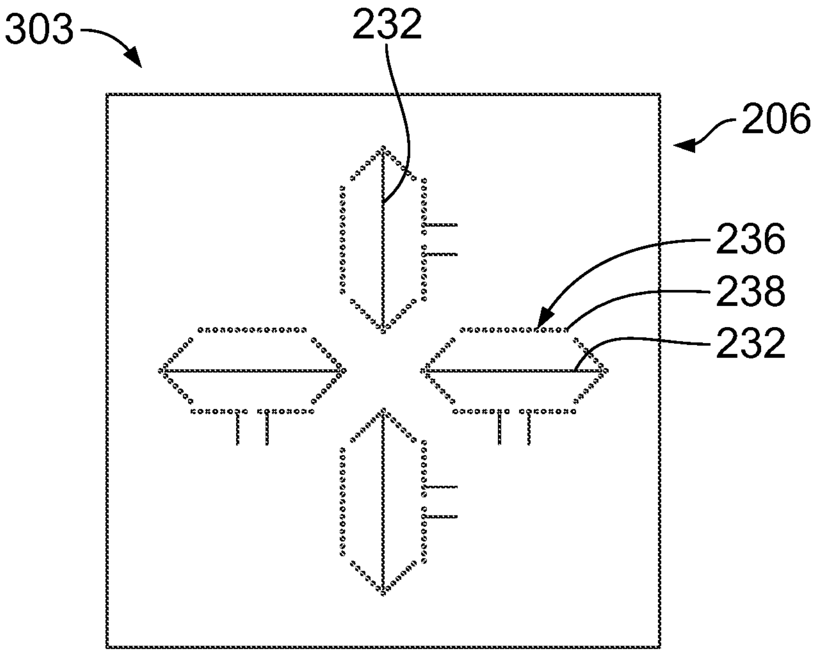
FIG. 15 is an enlarged view of a portion of the grounding structure showing one of the quadrants in accordance with an exemplary embodiment.

FIG. 15 is an enlarged view of a portion of the grounding structure 206 showing one of the quadrants 303. FIG. 15 shows four of the coupling apertures 232, which correspond to one of the square annulars 310 (shown in FIG. 13). Each of the coupling apertures 232 are configured to be aligned with a corresponding one of the feeding radiating slots 214*a* (shown in FIG. 13). Two of the coupling apertures 232 are oriented horizontally and two of the coupling apertures 232 are oriented vertically. Other orientations are possible in alternative embodiments. In an exemplary embodiment, each coupling aperture 232 includes a via cavity 236 of vias 238 surrounding the coupling aperture 232. The via cavity may isolate the coupling aperture 232 from other coupling apertures 232.

Figure 16:
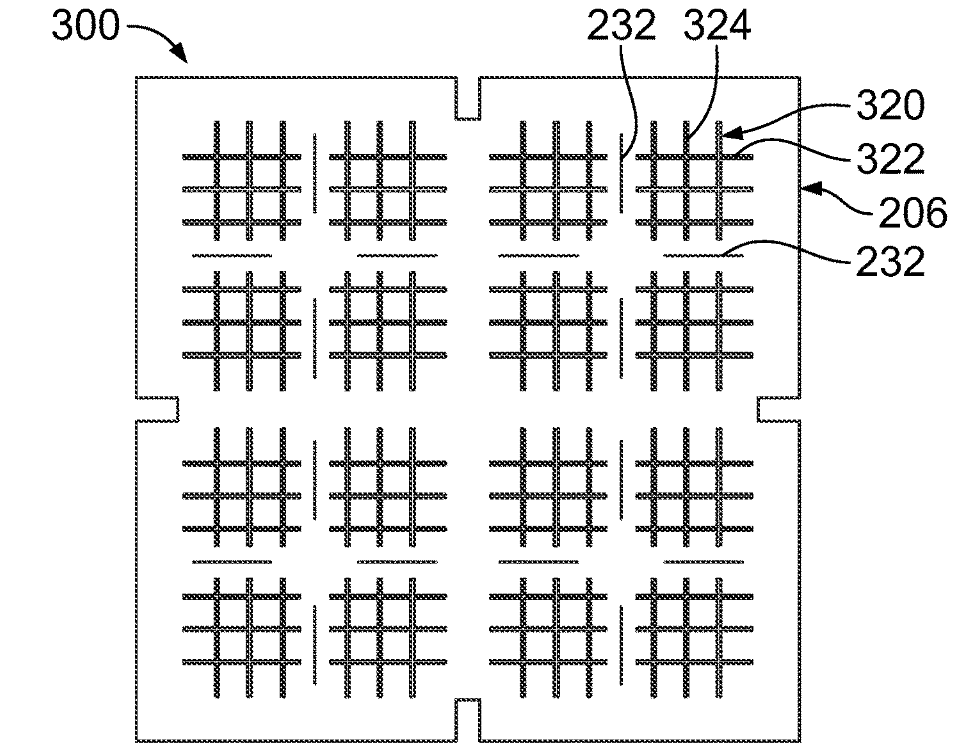
FIG. 16 is a top view of the grounding with feeding coupling slot structure of the antenna element in accordance with an exemplary embodiment.

FIG. 16 is a top view of the grounding structure 206 of the antenna element 300 in accordance with an exemplary embodiment. The grounding structure 206 includes the same pattern of coupling apertures 232 as shown in FIG. 14. However, the grounding structure 206 additionally includes grid slots 320 adjacent the coupling apertures 232. The grid slots 320 are spaced apart from the coupling apertures 232 but located in close proximity to the coupling apertures 232. The grid slots 320 are open through the grounding structure 206. The grid slots 320 may include horizontal slots 322 and vertical slots 324 forming a crisscross pattern. However, the grid slots 320 may have other shapes in alternative embodiments. The grid slots 320 may alleviate performance deterioration which may occur due to the air gap between the radiating structure 202 and the feeding structure 204. The grid slots 320 mitigate parasitic loss in a direction parallel to the air gap to enable recovery of antenna gain.

Figure 17:
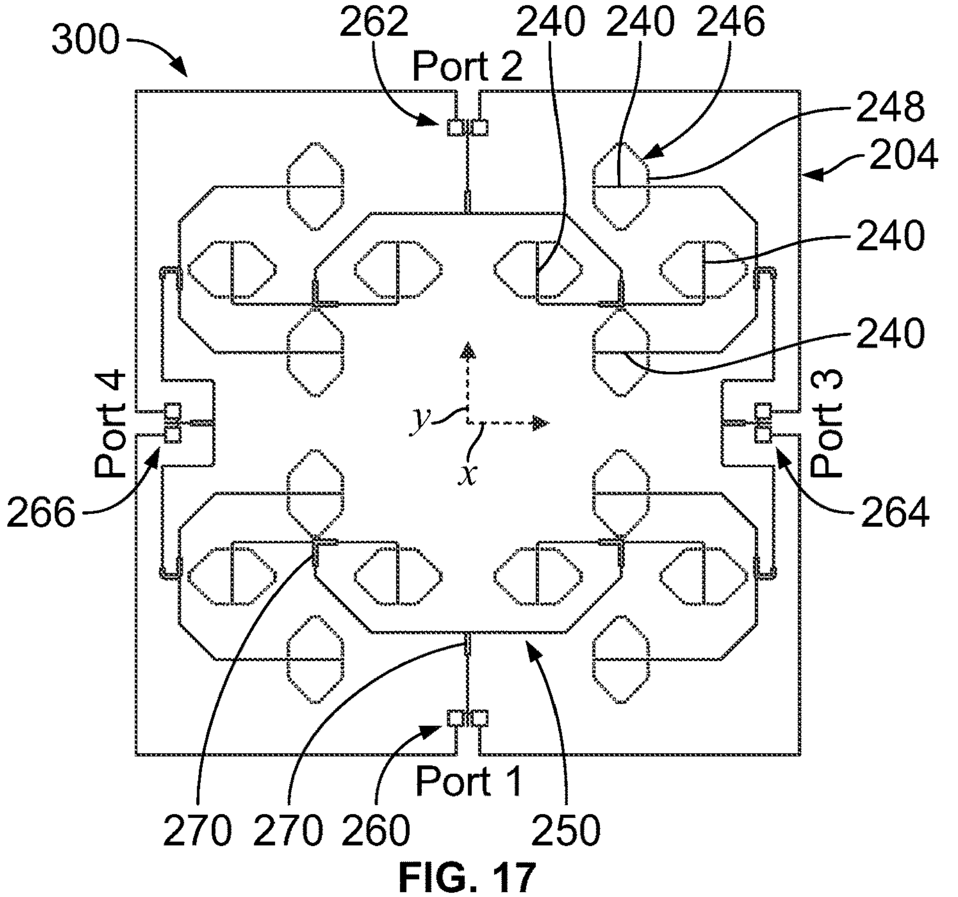
FIG. 17 is a top view of the feeding structure of the antenna element in accordance with an exemplary embodiment.

FIG. 17 is a top view of the feeding structure 204 of the antenna element 300 in accordance with an exemplary embodiment. FIG. 17 illustrates feeding circuits 250 for each of the square annulars 310. FIG. 17 shows four of the feeding circuits 250. In an exemplary embodiment, two of the feeding circuits 250 are used for vertical polarization and two of the feeding circuits 250 are used for horizontal polarization. Each feeding circuit is used to feed two of the square annulars 310.

In an exemplary embodiment, each feeding circuit 250 includes a strip feedline 240 for each of the metasurface antenna units 200. The strip feedline 240 is configured to be located vertically below, and traverse across, the corresponding coupling aperture 232 (shown in FIG. 14) and feeding radiating slot 214 (shown in FIG. 13). The strip feedline 240 feeds the corresponding metasurface antenna unit 200 through the coupling aperture 232. In an exemplary embodiment, each strip feedline 240 includes a corresponding via cavity 246 of vias 248 surrounding the strip feedline 240. The via cavity 246 may isolate the strip feedline 240 from other strip feedlines 240.

In an exemplary embodiment, the strip feedlines 240 associated with the first and second horizontal polarity metasurface antenna units 200*a*, 200*b* are fed from a common input and may be part of a common feed strip line. The strip feedlines 240 associated with the first and second vertical polarity metasurface antenna units 200*c*, 200*d* are fed from a common input and may be part of a common feed strip line.

In an exemplary embodiment, the feeding structure 204 includes a first horizontal feed input 260, a second horizontal feed input 262, a first vertical feed input 264, and a second vertical feed input 266. In an exemplary embodiment, each feed input 260, 262, 264, 266 feds multiple strip feedlines 240. The first horizontal feed input 260 feeds the strip feedlines 240 associated with the first and second antenna annulars 302, 304. The second horizontal feed input 262 feeds the strip feedlines 240 associated with the third and fourth antenna annulars 306, 308. The first vertical feed input 264 feeds the strip feedlines 240 associated with the second and third antenna annulars 304, 306. The second vertical feed input 266 feeds the strip feedlines 240 associated with the first and fourth antenna annulars 302, 308. In the illustrated embodiment, the first and second horizontal feed inputs 260, 262 are located at opposite sides of the feeding structure 204, such as the top and bottom and the first and second vertical feed input 264, 266 are located at opposite sides of the feeding structure 204, such as the right and left. The feed inputs 260, 262, 264, 266 branch outward at branch locations 270, such as T-junctions, to feed different square annular antenna elements 310 and/or metasurface antenna units 200. The feeding structure 204 has a simple feeding network for feeding many radiating elements. For example, in the illustrated embodiment, four feed inputs are provided feeding a total of two-hundred forty (240) radiating elements 210 (for example, each square annular 310 includes sixty radiating elements 210).

Figure 18:
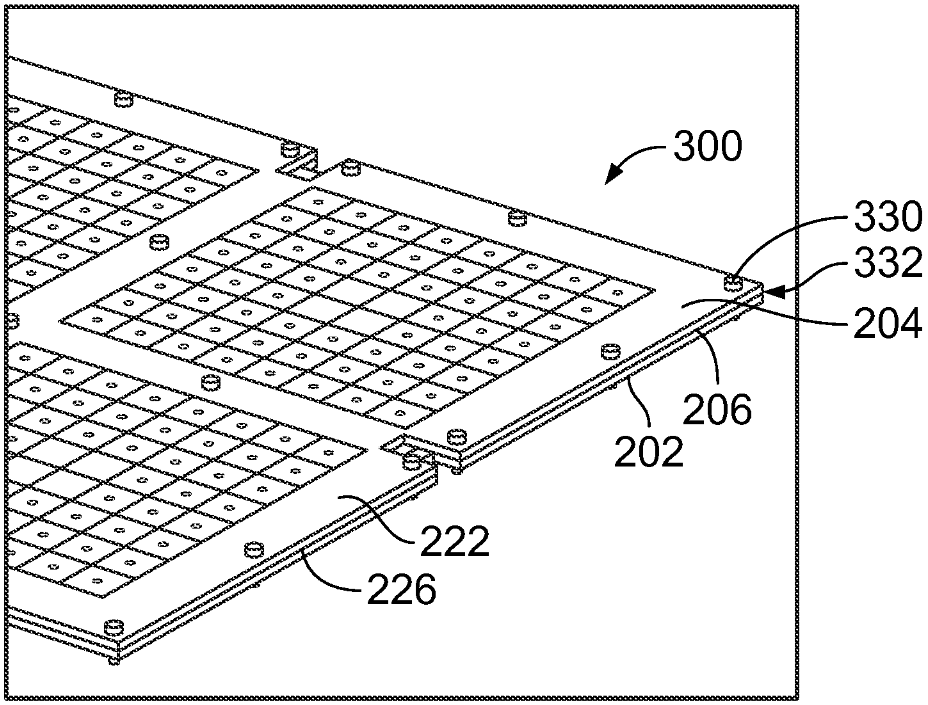
FIG. 18 is a perspective view of a portion of the antenna element showing screws holding together the radiating structure, the feeding structure, and the grounding structure in accordance with an exemplary embodiment.
Figure 19:
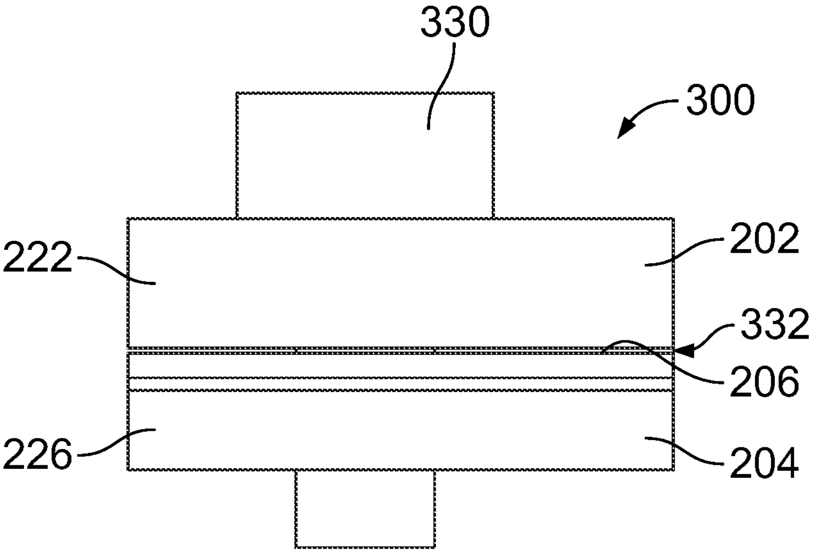
FIG. 19 is a side view of a portion of the antenna element showing one of the screws holding together the radiating structure, the feeding structure, and the grounding structure in accordance with an exemplary embodiment.

FIG. 18 is a perspective view of a portion of the antenna element 300 showing screws 330 holding together the radiating structure 202, the feeding structure 204, and the grounding structure 206. FIG. 19 is a side view of a portion of the antenna element 300 showing one of the screws 330 holding together the radiating structure 202, the feeding structure 204, and the grounding structure 206. In an exemplary embodiment, an air gap 332 is provided between the radiating structure 202 and the feeding structure 204. The air gap 332 allows relative movement between the radiating substrate 222 and the feeding substrate 226, such as to allow for thermal expansion and contraction. The screws 330 maintain the general positioning of the radiating substrate 222 and the feeding substrate 226. The air gap 332 reduces the risk of warpage due to the substrates 222, 226 being manufactured from different materials. In an exemplary embodiment, the grid slots 320 (shown in FIG. 16) are used to alleviate performance deterioration which may occur due to the air gap 332 between the radiating structure 202 and the feeding structure 204.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. An antenna assembly comprising:

a metasurface antenna unit including a radiating structure, a feeding structure coupled to the radiating structure, and a grounding structure;

the radiating structure including radiating elements arranged in an m×n grid of m rows of radiating elements and n columns of radiating elements, where n is greater than m, the radiating elements being separated by radiating slots with edges of the radiating elements facing each other across the radiating slots, each radiating element including a pad and a via extending from the pad through the radiating structure to the ground plane, each pad being rectangular wherein the vias have a spacing between the vias within the row, at least two of the spacings being different from each other;

the grounding structure including a ground plane having a coupling aperture therethrough; and the feeding structure including a single strip feedline for feeding the radiating elements, the strip feedline passing across the coupling aperture and feeding the radiating structure through the coupling aperture;

wherein at least one of the radiating elements is fed through at least one other radiating element across the corresponding radiating slot.

2. The antenna assembly of claim 1, wherein n is at least double m.

3. The antenna assembly of claim 1, wherein the radiating slots have a slot width.

4. The antenna assembly of claim 3, wherein the slot widths of at least two of the radiating slots differ from each other.

5. The antenna assembly of claim 1, wherein each pad is square.

6. The antenna assembly of claim 1, wherein the vias are centered relative to the corresponding pads.

7. The antenna assembly of claim 1, wherein the ground plane includes a via cavity of vias surrounding the coupling aperture.

8. The antenna assembly of claim 1, wherein the strip feedline includes a via cavity of vias surrounding the strip feedline.

9. The antenna assembly of claim 1, wherein a subset of the radiating elements are feed radiating elements aligned with the coupling aperture, the radiating elements being capacitively coupled to the strip feedline through the coupling aperture.

10. The antenna assembly of claim 9, wherein each of the other radiating elements are successively fed from the feed radiating elements through capacitive coupling of the radiating elements across the corresponding radiating slots.

11. The antenna assembly of claim 1, wherein the radiating structure includes a radiating substrate having a first dielectric constant and the feeding structure includes a feeding substrate having a second dielectric constant different from the first dielectric constant, the feeding substrate being separated from the radiating substrate by an air gap.

12. The antenna assembly of claim 11, wherein the ground plane includes grid slots therethrough remote from the coupling aperture.

13. The antenna assembly of claim 1, further comprising a dielectric cover covering the radiating structure, the dielectric cover being spaced apart from the radiating structure by a cover gap.

14. The antenna assembly of claim 1, further comprising a cover including a front cover and a rear cover having a cover cavity therebetween, the metasurface antenna unit received in the cover cavity, the rear cover being conductive and having a choke cavity along at least one side of the metasurface antenna unit.

15. The antenna assembly of claim 1, wherein the strip feedline traverses across the coupling aperture from one side of the coupling aperture to the opposite side of the coupling aperture.

16. An antenna assembly comprising:

a plurality of metasurface antenna units forming an antenna annular around an antenna pocket, the metasurface antenna units including first and second horizontal polarity metasurface antenna units on opposite sides of the antenna pocket and first and second vertical polarity metasurface antenna units on opposite sides of the antenna pocket;

each metasurface antenna unit including a radiating structure, a feeding structure coupled to the radiating structure, and a grounding structure, the radiating structure including radiating elements arranged in an m×n grid of m rows of radiating elements and n columns of radiating elements, where n is greater than m, the radiating elements being separated by radiating slots with edges of the radiating elements facing each other across the radiating slots, the grounding structure including a ground plane having a coupling aperture therethrough, and the feeding structure including a single strip feedline for feeding the radiating elements, the strip feedline passing across the coupling aperture and feeding the radiating structure through the coupling aperture, wherein at least one of the radiating elements is fed through at least one other radiating element across the corresponding radiating slot;

wherein first and second subsets of the radiating elements of the first horizontal polarity metasurface antenna unit are shared with corresponding radiating elements of the first and second vertical polarity metasurface antenna units, and wherein first and second subsets of the radiating elements of the second horizontal polarity metasurface antenna unit are shared with corresponding radiating elements of the first and second vertical polarity metasurface antenna units.

17. The antenna assembly of claim 16, wherein the radiating slot centered along the rows of radiating elements defines a feed radiating slot configured to be aligned with the corresponding coupling aperture for feeding the metasurface antenna unit by capacitive coupling to the strip feedline through the coupling aperture, the feed radiating slots being aligned with the antenna pocket.

18. The antenna assembly of claim 16, wherein the shared radiating elements radiate based on inputs from both the corresponding first or second horizontal polarity metasurface antenna unit and the corresponding first or second vertical polarity metasurface antenna unit.

19. The antenna assembly of claim 16, wherein the first and second horizontal polarity metasurface antenna units are fed from a common horizontal feed input and the first and second vertical polarity metasurface antenna units are fed from a common vertical feed input.

20. An antenna assembly comprising:

an antenna substrate having a radiating substrate at an upper portion of the antenna substrate and a feeding substrate at a lower portion of the antenna substrate, the antenna substrate including a first quadrant, a second quadrant, a third quadrant, and a fourth quadrant;

a first antenna annular in the first quadrant, a second antenna annular in the second quadrant, a third antenna annular in the third quadrant, and a fourth antenna annular in the fourth quadrant, each of the antenna annulars including a plurality of metasurface antenna units forming a square annular around an antenna pocket, the metasurface antenna units including first and second horizontal polarity metasurface antenna units on opposite sides of the antenna pocket and first and second vertical polarity metasurface antenna units on opposite sides of the antenna pocket;

each metasurface antenna unit including a radiating structure, a feeding structure coupled to the radiating structure, and a grounding structure, the radiating structure including radiating elements arranged in an m×n grid of m rows of radiating elements and n columns of radiating elements, where n is greater than m, the radiating elements being separated by radiating slots with edges of the radiating elements facing each other across the radiating slots, the grounding structure including a ground plane having a coupling aperture therethrough, and the feeding structure including a single strip feedline for feeding the radiating elements, the strip feedline passing across the coupling aperture and feeding the radiating structure through the coupling aperture, wherein at least one of the radiating elements is fed through at least one other radiating element across the corresponding radiating slot;

wherein first and second subsets of the radiating elements of the first horizontal polarity metasurface antenna unit are shared with corresponding radiating elements of the first and second vertical polarity metasurface antenna units, and wherein first and second subsets of the radiating elements of the second horizontal polarity metasurface antenna unit are shared with corresponding radiating elements of the first and second vertical polarity metasurface antenna units.

21. The antenna assembly of claim 20, wherein each radiating element includes a pad and a via extending from the pad through the radiating structure to the ground plane, each pad being rectangular.

22. The antenna assembly of claim 21, wherein the vias have a spacing between the vias within the row, at least two of the spacings being different from each other.

23. The antenna assembly of claim 20, further comprising a first horizontal feed input, a second horizontal feed input, a first vertical feed input, and a second vertical feed input, the first horizontal feed input feeding the first and second antenna annulars, the second horizontal feed input feeding the third and fourth antenna annulars, the first vertical feed input feeding the second and third antenna annulars, the second vertical feed input feeding the first and fourth antenna annulars.

24. The antenna assembly of claim 20, wherein the radiating substrate has a first dielectric constant and the feeding substrate having a second dielectric constant different from the first dielectric constant, the feeding substrate being separated from the radiating substrate by an air gap, the ground plane facing the air gap, the ground plane including grid slots through the ground plane in each of the first quadrant, the second quadrant, the third quadrant, and the fourth quadrant.

25. The antenna assembly of claim 20, further comprising a cover including a front cover and a rear cover having a cover cavity therebetween, the metasurface substrate received in the cover cavity, the rear cover being conductive and having a choke cavity along each of the first quadrant, the second quadrant, the third quadrant, and the fourth quadrant.

26. The antenna assembly of claim 20, wherein the radiating elements of the first antenna annular are separated from the radiating elements of the second antenna annular by a first spacing wider than the radiating slots, the radiating elements of the second antenna annular being separated from the radiating elements of the third antenna annular by a second spacing wider than the radiating slots, the radiating elements of the third antenna annular being separated from the radiating elements of the second antenna annular by a third spacing wider than the radiating slots, and the radiating elements of the fourth antenna annular being separated from the radiating elements of the first antenna annular by a fourth spacing wider than the radiating slots;

wherein the radiating elements are configured to be strongly capacitively coupled to other radiating elements across the radiating slots and wherein the radiating elements are configured to be weakly capacitively coupled to other radiating elements across the first, second, third, and fourth spacings.

* * * * *